United States Patent
Osgood et al.

(10) Patent No.: US 12,042,848 B2
(45) Date of Patent: Jul. 23, 2024

(54) CASTING ASSEMBLY

(71) Applicant: General Electric Company, Schenectady, NY (US)

(72) Inventors: Daniel Endecott Osgood, Loveland, OH (US); Evin Nathaniel Barber, Logan, UT (US); Brian Patrick Peterson, Madeira, OH (US); Xi Yang, Liberty Township, OH (US); Christopher D. Barnhill, Cincinnati, OH (US); Brian David Przeslawski, Dayton, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 18/079,979

(22) Filed: Dec. 13, 2022

(65) Prior Publication Data
US 2024/0189890 A1 Jun. 13, 2024

(51) Int. Cl.
*B22C 9/10* (2006.01)
*B22C 9/24* (2006.01)
*B33Y 80/00* (2015.01)

(52) U.S. Cl.
CPC ............... *B22C 9/108* (2013.01); *B22C 9/24* (2013.01); *B33Y 80/00* (2014.12)

(58) Field of Classification Search
CPC .. B22C 9/108; B22C 9/22; B22C 9/24; B22C 9/064
See application file for complete search history.

(56) References Cited

U.S. PATENT DOCUMENTS

| | | | |
|---|---|---|---|
| 6,530,416 B1 | 3/2003 | Tiemann | |
| 6,766,850 B2 | 7/2004 | Gegel et al. | |
| 10,449,601 B2 | 10/2019 | Cogneras et al. | |
| 10,815,827 B2 | 10/2020 | Swift et al. | |
| 10,821,498 B2 | 11/2020 | Kyttanen | |
| 11,173,542 B2 | 11/2021 | Yang et al. | |
| 11,235,378 B2 | 2/2022 | Yang et al. | |
| 11,267,044 B2 | 3/2022 | Kuo et al. | |
| 2012/0291983 A1* | 11/2012 | Graham | B22D 29/002 164/6 |
| 2014/0341724 A1* | 11/2014 | Weber | B22C 21/14 428/596 |
| 2015/0306657 A1 | 10/2015 | Frank | |
| 2018/0009128 A1 | 1/2018 | Sokol et al. | |
| 2018/0161866 A1* | 6/2018 | Deines | B22C 9/10 |

* cited by examiner

*Primary Examiner* — Kevin P Kerns
*Assistant Examiner* — Steven S Ha
(74) *Attorney, Agent, or Firm* — McGarry Bair PC

(57) ABSTRACT

A casting assembly includes at least a first body and a second body. The first body can be a core and the second body can be a shell. The first body has a first interior surface and a first exterior surface. The second body has a second interior surface spaced from a second exterior surface. A portion of the second interior surface is spaced from and facing the first exterior surface. The first body having a casting hollow, where the casting hollow is at least partially defined by the first interior surface.

30 Claims, 8 Drawing Sheets

CASTING ASSEMBLY

TECHNICAL FIELD

The disclosure generally relates to a casting assembly for forming a component, more specifically a casting assembly for forming a cast component, the casting assembly having a first body with a casting hollow.

BACKGROUND

A cast component can be formed by investment casting molding using a core-shell mold. The core-shell mold includes at least a core and a shell, with at least one cavity between the core and the shell. The core-shell mold can be manufactured using an additive manufacturing process. Openings in the core-shell mold can be plugged or covered using, for example, wax, in preparation for the casting process.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
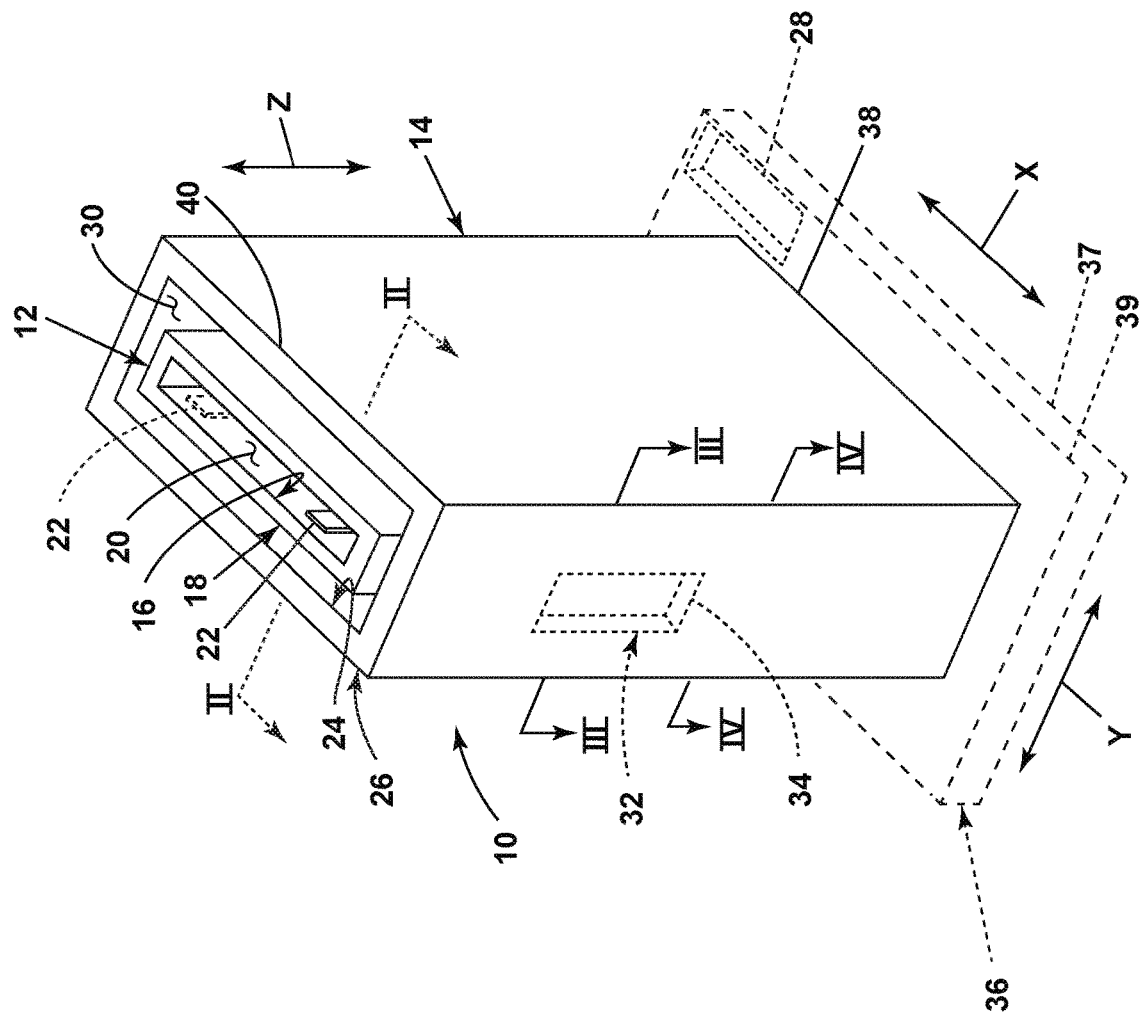
FIG. 1 is a schematic perspective view of a casting assembly having a first body and a second body in accordance with an exemplary embodiment of the present disclosure.

Aspects of the disclosure herein are directed to a casting assembly. The casting assembly can include a first body and a second body. The first body includes a casting hollow with structural elements located in the casting hollow. A gap region can be located between the first body and the second body.

The casting assembly can be an intermediate investment casting mold, where the first body can be a core and the second body can be a shell. The first body and the second body can be integrally formed, for example, by additive manufacturing. The casting hollow in the first body can reduce differences in thickness during additive manufacturing of the first body by reducing print forces.

Molten material can be poured or otherwise injected between the first body and the second body at, for example, the gap region. When molten material is provided to form a cast component, shrinkage can occur. Shrinkage can occur during solidification due to a change in density. That is, when the molten or liquid material solidifies into a denser solid material, the volume of solid material can be less than the volume of the same material when in a less dense liquid state. The casting hollow of the first body can be tailored to anticipate shrinkage that occurs during firing, which can improve the accuracy of the dimensions of the cast component.

Optionally, one or more linking structures or ligaments are formed between the first body and the second body.

Reference will now be made in detail to a casting assembly where the first body and the second body are ceramic, however, any casting assembly or investment casting mold where the first body and the second body are a different material are considered. The detailed description uses numerical and letter designations to refer to features in the drawings.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The term "fluid" may be a gas or a liquid, or multi-phase.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

As used herein, the term "additive manufacturing" generally refers to manufacturing processes wherein successive layers of material(s) are provided on each other to "build-up," layer-by-layer, a three-dimensional component. The successive layers generally fuse together to form a monolithic unitary component, which can have a variety of integral sub-components. Monolithic, as used herein, refers to a unitary structure lacking interfaces or joints by virtue of the materials of each layer fusing to or melting with the materials of adjacent layers such that the individual layers lose their identity in the final unitary structure.

Suitable additive manufacturing techniques in accordance with the present disclosure include, for example, Directed Energy Deposition (DED), Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The Digital Light Processing (DLP) can include a 3D DLP printer having a transparent vat or transparent tank, a building platform, and a light assembly. The transparent vat or transparent tank can contain, for example, a photopolymer resin.

The DLP building platform can couple to, for example, a motor or other mechanisms permitting the movement of the building platform in one or more dimensions, such as raising or lowering the building platform from or toward the resin in the vat or tank.

A DLP printed component can couple to a lower portion of the building platform facing the vat or tank. The lighting assembly is located, at least in part, below the vat or tank. The lighting assembly can include at least one light source and at least one optical reflector or refractor such as, for example, a deflection mirror or at least one lens.

A controller coupled to or included in the DLP printer can control one or more aspects of the DLP printer such as, for example, the position of the DLP building platform or the intensity, duration, or orientation of the lighting source.

In addition to using a direct metal laser sintering (DMLS) or direct metal laser melting (DMLM) process where an energy source is used to selectively sinter or melt portions of a layer of powder, it should be appreciated that according to alternative aspects of the present disclosure, the additive manufacturing process can be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent can be, for example, a photo-curable polymer or another liquid bonding agent. Other suitable additive manufacturing methods and variants are intended to be within the scope of the present subject matter.

The term "investment casting mold" as used herein generally relates to a mold that receives a liquid that later solidifies into a component. The liquid can be a molten metal or combination of various materials.

As used herein, the term "emanate" means to proceed from a source. In other words, the term "emanates" includes extending away from a surface or recessed into a surface. For example, a canyon, recess, or hole can emanate from the surface of the Earth. That is, the canyon, recess, or hole begins at the surface of the Earth and proceeds or recesses into the Earth. Similarly, a hill or mountain can emanate from the surface of the Earth. That is, the hill or mountain begins at the surface of the Earth and proceeds or extends away from the surface of the Earth.

FIG. 1 is a schematic illustration of a casting assembly 10 having a first body 12 and a second body 14. The second body 14 at least partially surrounds the first body 12. That is, the second body 14 can circumscribe, partially circumscribe, or form an arc around at least a portion of the first body 12.

The first body 12 and the second body 14 can be integrally formed. As used herein, the term "integrally formed" refers to component or parts that are unitarily formed or are welded or otherwise secured together. That is, the first body 12 and the second body 14 can be integrally formed with one or more linking portions between the first body 12 and the second body 14. It is contemplated that the first body 12 and the second body 14 can be unitarily formed through additive manufacturing such that the one or more linking portions are formed with the first body 12 and the second body 14 during the additive manufacturing process. Additionally, or alternatively, one or more linking portions can secure the first body 12 to one or more portions of the second body 14.

The first body 12 includes a first interior surface 16 and a first exterior surface 18, where the first exterior surface 18 is spaced from the first interior surface 16. The first exterior surface 18 can be a complementary to a shape or define at least a portion of a surface of a cast part or cast component. The cast component can be a component for a turbine engine such as, but not limited to, an airfoil, blade, vane, shroud, fuel nozzle, combustion liner, shroud hanger, combustor dome, deflector, or fairings.

A casting hollow 20 is a hollow space at least partially bound by the first interior surface 16. As illustrated, by way of example, the first interior surface 16 forms a perimeter, periphery, boundary, or otherwise outlines the casting hollow 20.

The casting hollow 20, illustrated as a void or space having the shape of a rectangular prism, can be any shape or combination of shapes. It is further contemplated that the casting hollow 20 can be a set of casting hollows. The set of casting hollows can be defined by the first interior surface 16 of the first body 12. That is, the first interior surface 16 can be discontinuous. In other words, the first interior surface 16 can be multiple separate or distinct interior walls such that the set of casting hollows are a set of multiple voids in the first body 12.

Alternatively, first interior walls of each first body in a set of first bodies can define the set of casting hollows (described presently). The second body 14 can be spaced from and at least partially circumscribe the first set of bodies. Any number of casting hollows and first bodies are contemplated, where at least one of the first bodies defines a casting hollow.

A structural element 22 is located within the casting hollow 20. While the structural element 22 is illustrated as a single element, any number of structural elements are contemplated. Further, the structural element 22 can be a protuberance or emanate from the first interior surface 16. That is, the structural element 22, or any number of structural elements can emanate or otherwise extend from the first interior surface 16.

The second body 14 includes a second interior surface 24 and a second exterior surface 26, where the second exterior surface 26 is spaced from the second interior surface 24.

A gap region 30 is defined by or bound by at least a portion of the first exterior surface 18 of the first body 12 and at least a portion of the second interior surface 24 of the second body 14.

By way of non-limiting example, the first body 12 and the second body 14 are illustrated as hollow rectangular prisms to ease description and explanation. While illustrated as a hollow rectangular prism, any shape or combination of shapes is contemplated for the first body 12, the second body 14, the casting hollow 20, or the gap region 30. For example, the first body 12 or the second body 14 can be a hollow prism having a cross-section that is a circle, oval, ellipse, square, any regular or irregular polygon, or any combination therein. That is, the first body 12 or the second body 14 can include a complex or compound shape. Further, aspects of the drawings are not scaled and elements are often exaggerated to ease description and explanation.

Optionally, at least one aperture or a window 32 can be included in the second body 14. The window 32 can be any shaped through opening, hole, or passage that extends from the second exterior surface 26 to the second interior surface 24. A window passage can be defined by at least one window wall 34 extending from the second exterior surface 26 to the second interior surface 24. Any number of windows 32 in the second body 14 are contemplated. It is also contemplated that the first body 12 can include one or more windows (not shown) that extend from the first exterior surface 18 to the first interior surface 16. If the casting assembly is coated after additively manufacturing for otherwise forming the first body 12 and the second body 14, the window 32 or the one or more windows can be filled with a leachable material, such as, but not limited to, wax.

Optionally, a mold base 36 can support at least a portion of at least one of the first body 12 or the second body 14. That is, the first body 12 or the second body 14 can extend from the mold base 36. It is contemplated that the mold base 36 can be additively manufactured with or otherwise coupled to the first body 12 and the second body 14, forming one or more linking portions between the first body 12 and the second body 14. That is, the mold base 36 can couple a first lower portion of the first body 12 to a second lower portion 38 of the second body 14. It is further contemplated that the mold base 36 can be machined or at least partially removed from the first body 12 or the second body 14.

The mold base 36 can include a base window 28 that extends through the mold base 36 from a first base surface 37 to second base surface 39. While illustrated as a rectangular prism, any shape or combination of shapes is contemplated. Further, any number of base windows 28 in the mold base 36 are contemplated. It is also contemplated that the base window 28 can lie beneath one or more of the second lower portion 38 or the first lower portion (not shown).

In addition to or alternatively to the base window 28, the mold base 36 can include any number of protrusions or recesses (not shown), having any shape or combination of shapes.

A Z-axis is defined in the direction from the second lower portion 38 to a second upper portion 40. The Z-axis can be along a span length of the casting assembly 10. An X-axis is defined along the second lower portion 38 and perpendicular or 90 degrees from the Z-axis. The X-axis can be a chord length. A Y-axis is defined in a plane perpendicular to the X-axis and the Y-axis.

The casting assembly 10 is illustrated, by way of example, as an intermediate investment casting mold, where the first body 12 is a core and the second body 14 is a shell. The gap region 30 receives molten material such that a geometry of at least a portion of the second interior surface 24 of the second body 14 or shell is complementary to at least a portion of a cast component exterior surface. Further, the first exterior surface 18 of the first body 12 or core includes a geometry complementary to at least a portion of a cast component interior surface.

Figure 2:
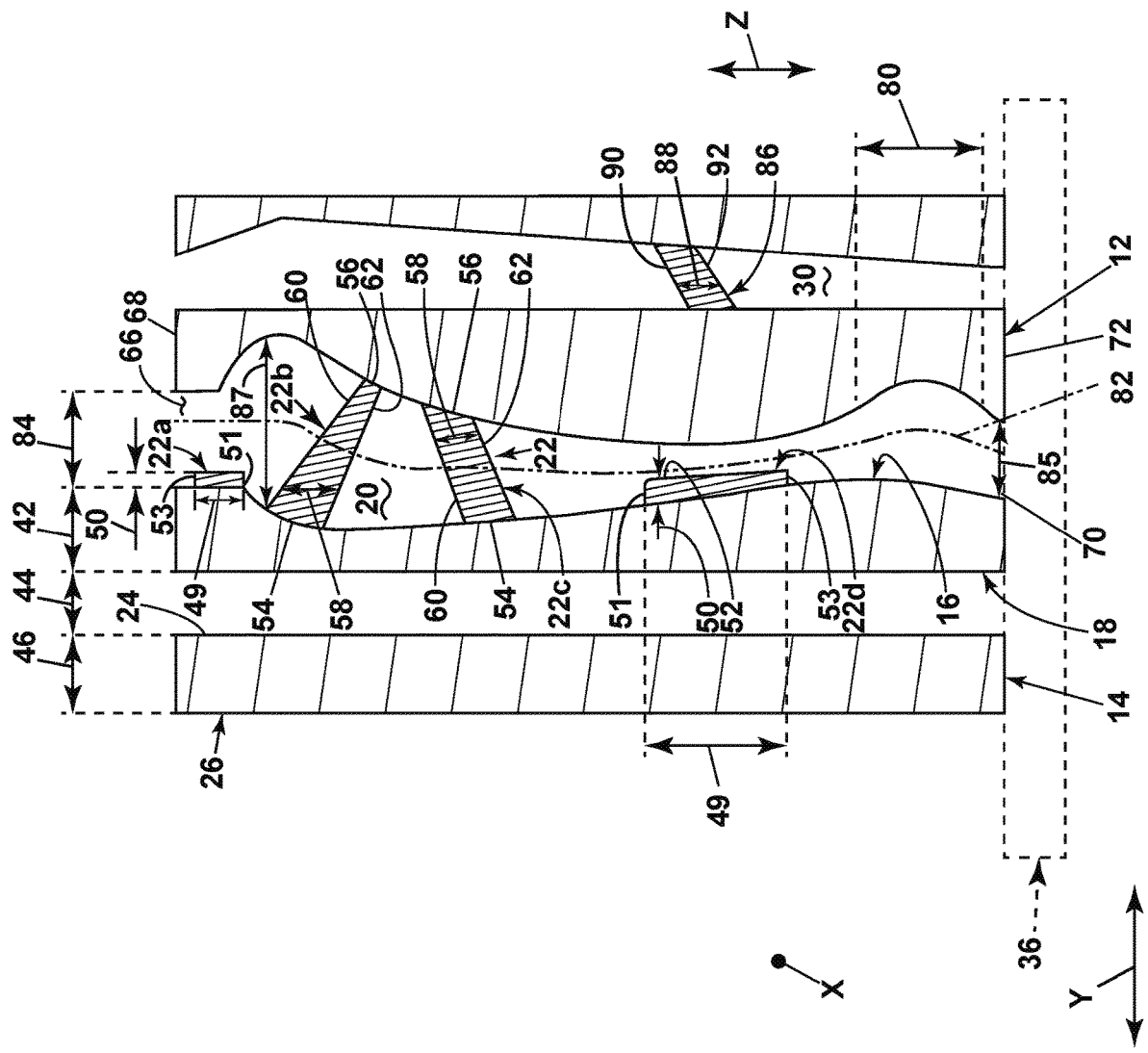
FIG. 2 is a cross-section taken along line II-II of FIG. 1 in accordance with an exemplary embodiment of the present disclosure.

FIG. 2 is a cross-section taken at line II-II of FIG. 1 and illustrates the details of the casting hollow 20 along with the spatial relationships between the first body 12, the second body 14, and the structural element 22, illustrated as a set of structural elements including a stiffening structure 22a, a support structure 22b, a support structure 22c, and a stiffening structure 22d.

A first body thickness 42 is measured from the first interior surface 16 to the first exterior surface 18. The first body thickness 42 can vary or change when measured at different locations along the Z-axis, Y-axis, or X-axis.

A gap thickness 44 of the gap region 30 is measured from the first exterior surface 18 of the first body 12 to the second interior surface 24 of the second body 14. The gap thickness 44 can vary or change when measured at different locations along the Z-axis, Y-axis, or X-axis.

A second body thickness 46 is measured from the second interior surface 24 to the second exterior surface 26. The second body thickness 46 can vary or change when measured at different locations along the Z-axis, Y-axis, or X-axis.

While illustrated as coupled to the first body 12 for ease of understanding, the structural elements 22a, 22b, 22c, 22d can be formed with the first body 12. That is, one or more of the structural elements 22a, 22b, 22c, 22d can be formed from the same material, additively manufactured, or otherwise unitarily formed with the first body 12.

The structural elements 22 can include any number of stiffening structures 22a, 22d or support structures 22b, 22c. The stiffening structures 22a, 22d emanate, protrude, extend, or otherwise project from the first interior surface 16 into the casting hollow 20. The stiffening structures 22a, 22d provide a raised geometry on at least one portion of the first interior surface 16 that defines the casting hollow 20. The stiffening structures 22a, 22d can stiffen the first interior surface 16 or provide thickness needed to reduce or redistribute forces on the casting assembly 10 during additive manufacturing, reduce geometric shrinkage during firing of the casting assembly 10, or reduce grain defects during casting of a component.

A first dimension or first distance 50 is measured from the first interior surface 16 to an outermost extent 52 of the stiffening structures 22a, 22d along the Y-axis. Alternatively, the first distance 50 can be measured from a first stiffening surface to a second stiffening surface along the Y-axis. The first stiffening surface and the second stiffening surface can be the outermost extents of the stiffening structures 22a, 22d in the Y-axis direction. Additionally, or alternatively, the first distance 50 can be the largest span of the stiffening structures 22a, 22d as measured in the Y-axis direction.

It is contemplated that the first distance 50 can vary or change along the Z-axis direction as illustrated, by way of example, by the stiffening structure 22d. It is further contemplated that the first distance 50 can vary along the X-axis direction. That is, the first distance 50 of the stiffening structures 22a, 22d can be constant or vary when measured at different locations. The first distance 50 can be equal to or between 0.001 and 0.200 inches (0.025 and 5.080 millimeters). More specifically, the first distance 50 can be equal to or between 0.005 and 0.150 inches (0.127 and 3.810 millimeters). Further, it is contemplated that the first distance 50 can be 15%-400% of the thickness of the first body thickness 42 or the second body thickness 46 as measured in the same plane as the first distance 50 in the Y-axis direction.

The stiffening structures 22a, 22d emanate, extend, or otherwise project from the first interior surface 16 into the casting hollow 20 a second distance 49 or height as measured from a top surface 51 to a bottom surface 53, measured along the Z-axis or along the first interior surface 16. It is contemplated that the second distance 49 can vary or change along the Z-axis direction, as illustrated, or along the X-axis. That is, the second distance 49 or height of the stiffening structures 22a, 22d can be constant or vary when measured at different locations. The second distance 49 can be equal to or between 0.010 and 3.000 inches (0.254 and 76.20 millimeters). More specifically, the second distance 49 can be equal to or between 0.020 and 2.500 inches (0.508 and 63.50 millimeters). Further, it is contemplated that the second distance 49 can be 5%-175% of the thickness of the first body thickness 42 or the second body thickness 46. The ratio of the second distance 49 to the first body thickness 42 or the second body thickness 46 can be between 0.006 and 0.12.

The support structures 22b, 22c span the casting hollow 20. That is, the support structures 22b, 22c couple one or more first portions 54 of the first interior surface 16 to one or more second portions 56 of the first interior surface 16, where the one or more second portions 56 are spaced from the one or more first portions 54. The support structures 22b, 22c provide a connecting geometry that stiffens or strengthens one or more portions of the first body 12 by spanning across the casting hollow 20.

While illustrated as a having a cross-sectional shape that is rectangular, any cross-sectional shape is considered. By way of non-limiting example, the cross-sectional shape could be one or more, or a combination of a: circle, rounded rectangle, oval, regular polygon, irregular polygon, V-shaped, U-shaped, X-shaped, T-shape, crescent, semi-circle, teardrop, or trefoil.

It is contemplated that the support structures 22b, 22c can change cross-sectional area or shape. It is also contemplated that the support structures 22b, 22c can extend from one or more portions of the first portion 54 to one or more portions of the second portion 56 in a linear or a non-linear manner. That is, the support structures 22b, 22c can be linear, curved, or any combination therein. Additionally, it is contemplated that the support structures 22b, 22c can be angled horizontally, vertically, or a combination of horizontally and vertically relative to the mold base 36, the first portion 54, or the second portion 56.

A first support dimension or support height 58 is measured from a first support face 60 to a second support face 62, opposing the first support face 60. It is contemplated that the support height 58 can be measured along the Z-axis or in a direction generally perpendicular to the first support face 60 and the second support face 62. As used herein, the term "generally perpendicular" implies the formation of an angle between 80 degrees and 100 degrees.

It is contemplated that the support height 58 can vary or differ as the support structure 22b, 22c extends from the first portion 54 to the second portion 56. That is, the support height 58 of the support structure 22b, 22c can be constant or vary when measured at different locations when measure along the Z-axis or in a direction generally perpendicular to the first support face 60 or the second support face 62.

The support height 58 can be equal to or between 0.010 and 5.000 inches (0.254 and 127 millimeters). More specifically, the support height 58 can be equal to or between 0.020 and 4.000 (0.508 and 101.6 millimeters). Further, it is contemplated that the support height 58 can be 20%-20,000% of the first body thickness 42 or the second body thickness 46 measured in the Y-axis direction. That is, the ratio of the support height 58 and the first body thickness 42 or the second body thickness 46 can be between 0.2 and 200.

The casting hollow 20 can include an upper inlet or upper opening 66 at a first upper portion 68 of the first body 12. The upper opening 66 can fluidly couple the casting hollow 20 with ambient air. A lower opening 70 can be located at a first lower portion 72 of the first body 12. Optionally, at least a portion of the upper opening 66 or the lower opening 70 can be covered or closed. As illustrated, by way of example, the lower opening 70 can be closed by the mold base 36. It is contemplated that the upper opening 66 or the lower opening 70 can be closed or partially closed by portions of the first body 12 or one or more structural elements 22a, 22b, 22c, 22d.

A centerline 82 extends through the casting hollow 20, for example, from the upper opening 66 to the lower opening 70. The centerline 82 can be a non-linear centerline. As used herein, the term "non-linear" is used to describe a line whose descriptive equation would include one or more terms that are not of the first degree. The centerline 82 can illustrate a middle or midpoint between the first portion 54 and the second portion 56 of the first interior surface 16. Additionally, or alternatively, the centerline 82 can pass through the geometric center of the casting hollow 20, extending from the first upper portion 68 of the first body 12 to the first lower portion 72 of the first body 12.

A curved portion 80 can be defined by a portion of the first interior surface 16. The curved portion 80 can include a radius of curvature or multiple radii of curvature, where the radius of curvature is greater than zero. It is contemplated that the first interior surface 16 can include any number of curved portions that have varying radius of curvature. It is further contemplated that the first interior surface 16 can have any number of recesses or protrusions having a variety of shapes that increase or decrease a cross-section or gap distance 84, as measured along the Y-axis, of the casting hollow 20.

The gap distance 84 is measured from the first portion 54 to the second portion 56. The first distance 50 of the stiffening structures 22a, 22d can be between 0%, where no stiffening structures are present, to less than 100% of the gap distance 84. While illustrated as less than 50% of the gap distance 84, it is contemplated that the stiffening structures 22a, 22d can extend past the centerline 82 of the casting hollow 20.

The gap distance 84 at the upper opening 66 or the lower opening 70 can be less than the gap distance 84 measured at a location between the upper opening 66 and the lower opening 70. That is an opening distance 85 or opening area measured at the upper opening 66 or the lower opening 70 can be less than a maximum gap distance 87 or maximum gap area measured across the casting hollow 20 in a plane defined by the X-axis and Y-axis. Optionally, the opening distance 85 can be between 1% or 300% of the maximum gap distance 87. More specifically, the opening distance 85 can be equal to or between 1% and 99% of the maximum gap distance 87. That is, the ratio between the maximum gap distance 87 and the opening distance 85 can be greater than one.

A connecting structure or ligament 86 can extend from the between the first body 12 and the second body 14. The ligament 86 can be formed with the first body 12 and the second body 14. While illustrated as a having a cross-sectional shape that is generally rectangular, any cross-sectional shape is considered. By way of non-limiting example, the cross-sectional shape could be one or more or a combination of a circle, rounded rectangle, oval, regular polygon, irregular polygon, V-shaped, U-shaped, X-shaped, T-shape, crescent, semi-circle, teardrop, or trefoil.

It is contemplated that the ligament 86 can increase or cross-sectional area or change shape along its body axis or as the ligament 86 extends from the first exterior surface 18 to the second interior surface 24. It is also contemplated that the ligament 86 can extend from any portion of the first body 12 to another portion of the second body 14 in a non-linear manner. That is, the ligament 86 can be linear, curved, or any combination therein. Additionally, it is contemplated that the ligament 86 can be angled horizontally, vertically, or a combination of horizontally and vertically relative to the mold base 36, the second interior surface 24 of the second body 14 or the first exterior surface 18 of the first body 12.

A first ligament dimension or ligament height 88 is measured from a first ligament face 90 to a second ligament face 92, opposing the first ligament face 90. It is contemplated that the ligament height 88 is measured along the Z-axis or in a direction generally perpendicular to the first ligament face 90 and the second ligament face 92. The ligament height 88 or other dimensions of the ligament 86 can be constant or vary when measured at different locations when measure along the Z-axis, X-axis, or in a direction perpendicular to the first ligament face 90 or the second ligament face 92.

The ligament height 88 can be equal to or between 0.005 and 0.200 inches (0.127 and 5.08 millimeters). More specifically, the ligament height 88 can be equal to or between 0.008 and 0.150 inches (0.203 and 3.81 millimeters). Further, it is contemplated that the ligament height 88 can be 5%-750% of the first body thickness 42 or the second body thickness 46. That is, a ratio of the ligament height 88 to the first body thickness 42 or the second body thickness 46 can be between 0.05 and 7.5.

Figure 4:
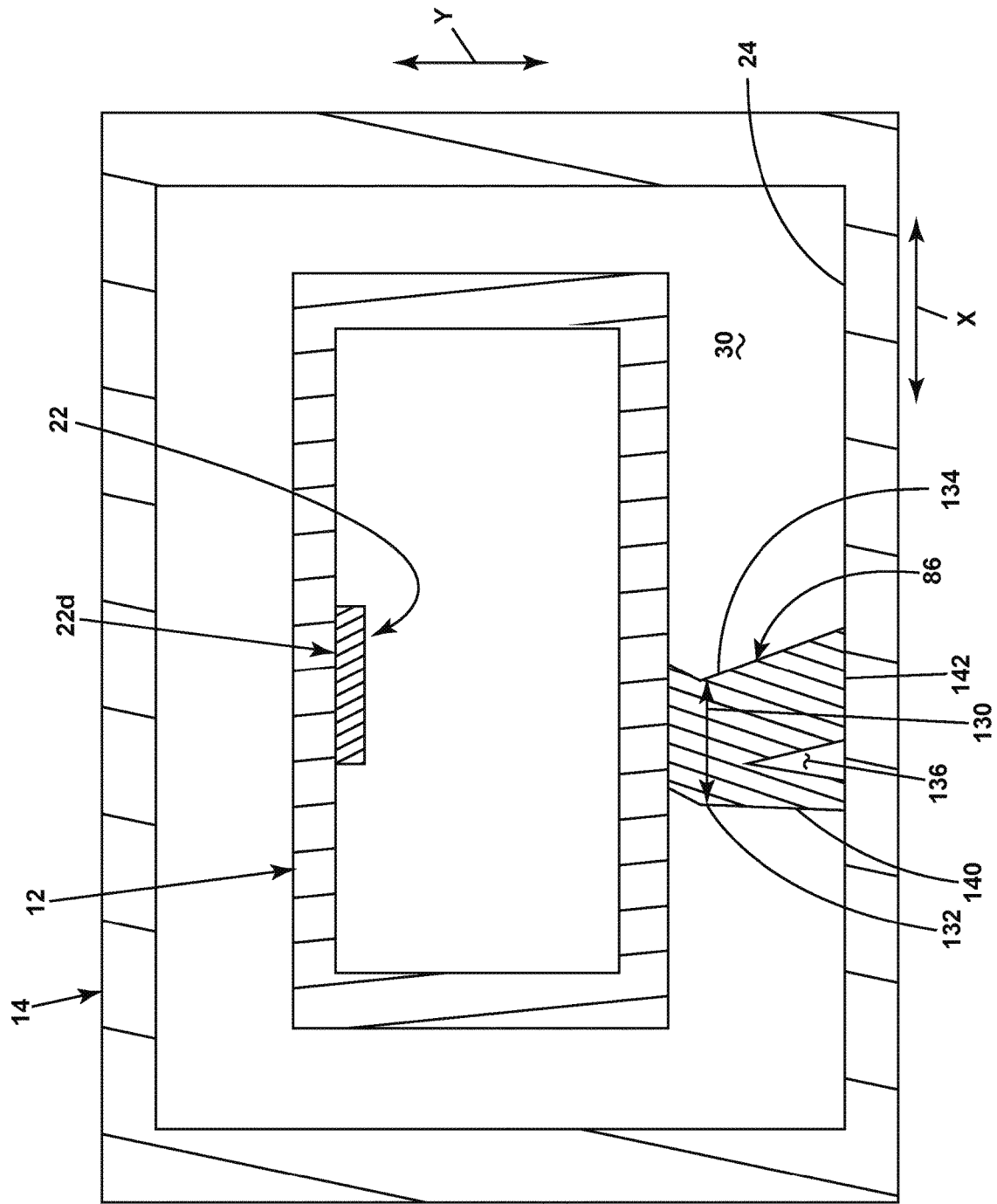
FIG. 4 is a cross-section taken along line IV-IV of FIG. 1 in accordance with an exemplary embodiment of the present disclosure.

While the ligament 86 is illustrated as a single ligament, any number of ligaments or connecting structures that couple one or more portions of the first body 12 to one or more portions of the second body 14 are contemplated. That is, the ligament 86 can be a set of ligaments or a plurality of ligaments. It is further contemplated that the ligament 86 can have a fork or divided shape (FIG. 4).

Figure 3:
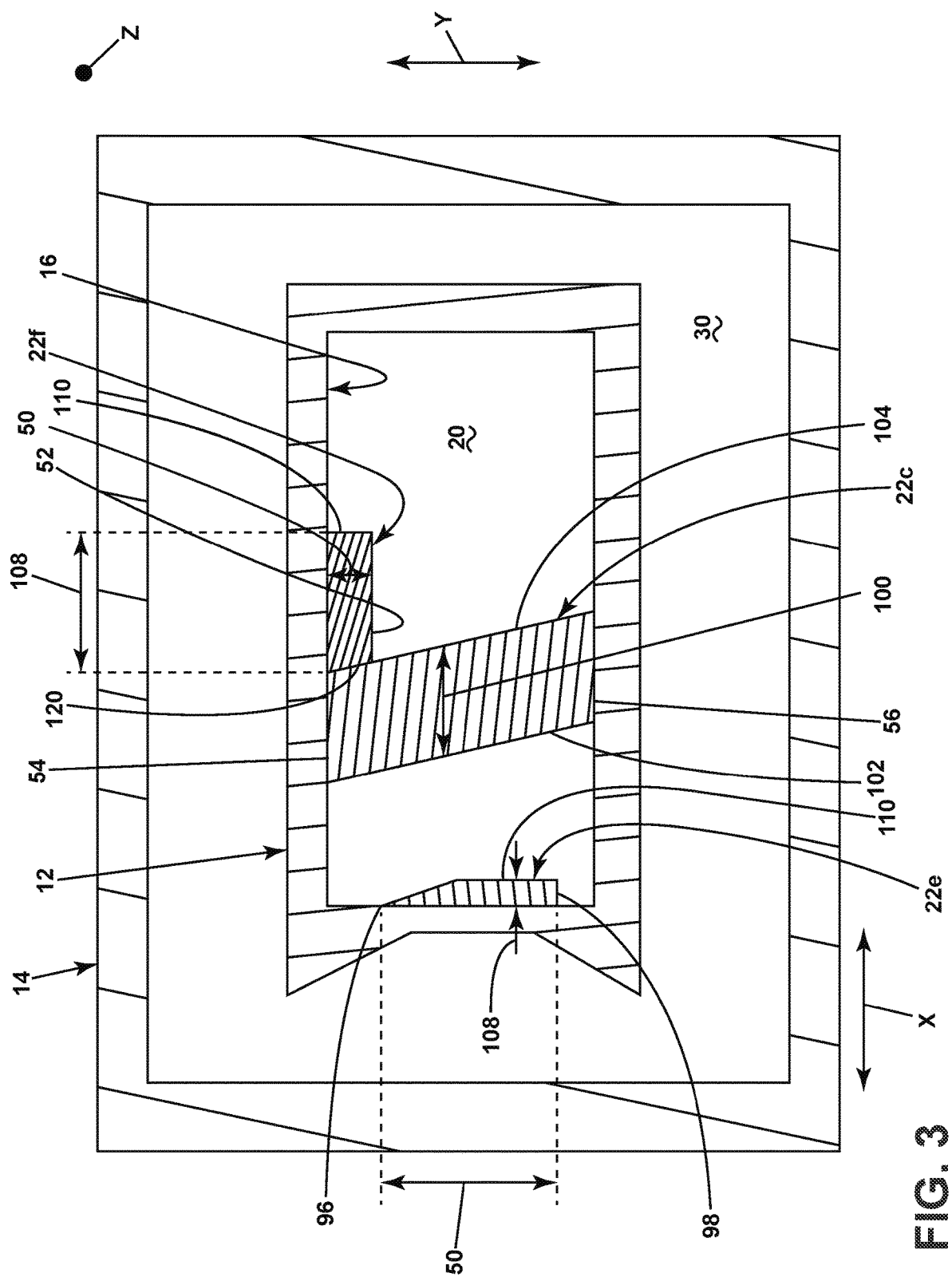
FIG. 3 is a cross-section taken along line III-III of FIG. 1 in accordance with an exemplary embodiment of the present disclosure.

FIG. 3 is a cross-section taken at line III-III of FIG. 1 and illustrates the details of the set of structural elements 22 along with the spatial relationships between the first body 12 and the second body 14.

As illustrated, by way of example, the set of structural elements 22 can include the support structure 22c and stiffening structures 22e, 22f. The support structure 22c, as also illustrated in FIG. 2, couples the first portion 54 to the second portion 56 of the first interior surface 16 of the first body 12.

A second support dimension or support depth 100 of the support structure 22c can be measured from a first side face 102 to a second side face 104, where the second side face 104 opposes the first side face 102. It is contemplated that the support depth 100 can be measured along the X-axis or in a direction generally perpendicular to the first side face 102 and the first side face 102. It is contemplated that the support depth 100 can vary as the support structure 22c extends in the Z-axis direction or the Y-axis direction. That is, the support depth 100 or depth of the support structure 22c can be constant or vary when measured at different locations along the X-axis, Y-axis, or the Z-axis or in a direction perpendicular to the first side face 102 or second side face 104.

The stiffening structure 22e emanates, extends, or otherwise projects from the first interior surface 16 into the casting hollow 20. The first distance 50 is measured from a first stiffening surface 96 to a second stiffening surface 98 along the Y-axis.

Similarly, the stiffening structure 22f emanates, extends, or otherwise projects from the first interior surface 16 into the casting hollow 20. The first distance 50 is measured from the first interior surface 16 to the outermost extent 52 along the Y-axis.

A third distance 108 or depth is measured from the first interior surface 16 to an interior surface 110 of the stiffening structures 22e, 22f, along the X-axis. Alternatively, the third distance 108 can be measured from a first stiffening surface to a second stiffening surface along the X-axis. It is contemplated that the third distance 108 of the stiffening structures 22e, 22f can vary along the Y-axis direction or the Z-axis direction. That is, the third distance 108 or depth of the stiffening structures 22e, 22f can be constant or vary when measured at different locations. The third distance 108 can be equal to or between 0.010 and 3.000 inches (0.254 and 76.2 millimeters). More specifically, the third distance 108 can be equal to or between 0.015 and 2.50 inches (0.381 and 63.5 millimeters). Further, it is contemplated that the third distance 108 can be 10%-12,500% of the first body thickness 42 (FIG. 2) or the second body thickness 46 (FIG. 2). That is, a ratio of the third distance 108 to the first body thickness 42 or the second body thickness 46 can be between 0.10 and 125.

A contact region 120 can be defined at an intersection of two or more structural elements 22. While illustrated as between the stiffening structure 22f and the support structure 22c, any contact between any number of stiffening structures or support structures are contemplated. That is, two or more structural elements of the set of structural elements 22 can intersect or overlap at an interface. Further, the set of structural elements 22 can form one or more intersecting arrangements such as, for example, a grid, lattice, or matrix.

The gap region 30 is the space between the first body 12 and the second body 14. It is contemplated that the gap region 30 can be filled with air. That is, the gap region 30 can be filled with air during the additive manufacturing of the first body 12 and the second body 14. Additionally, or alternatively, portions of the gap region 30 can be filled with wax. It is further contemplated that at least a portion of the gap region 30, during casting, can be filled with molten material that will harden into a component.

It is contemplated that the casting hollow 20 can be filled with air. Additionally, or alternatively, portions of the casting hollow 20 can be filled with wax or other material. While it is contemplated that the casting hollow 20 can be filled with one or more materials, during casting, the casting hollow 20 does not receive material that will harden into a component. That is, material added to the casting hollow 20 does not form the cast component. Material added to the casting hollow 20 is never in contact or is otherwise removable from the cast component.

FIG. 4 is a cross-section taken at line IV-IV of FIG. 1 and illustrates the details of the set of structural elements 22 along with the spatial relationships between the first body 12 and the second body 14.

A second ligament dimension or ligament width 130 can be measured from a first ligament portion 132 to a second ligament portion 134. By way of example, the second ligament portion 134 is spaced from the first ligament portion 132 the ligament width 130 as measured in the X-axis direction. The ligament width 130 or other dimensions of the ligament 86 can be constant or vary when measured at different locations when measure along the Z-axis, Y-axis, or in a direction perpendicular to the first ligament portion 132 or the second ligament portion 134.

The second ligament dimension or the ligament width 130 can be equal to or between 0.005 and 0.200 inches (0.127 and 5.08 millimeters). More specifically, the ligament width 130 can be equal to or between 0.008 and 0.150 inches (0.203 and 3.81 millimeters). Further, it is contemplated that the ligament width 130 can be 5%-750% of the first body thickness 42 or the second body thickness 46. That is, a ratio of the ligament width 130 to the first body thickness 42 or the second body thickness 46 can be between 0.05 and 7.5.

A ligament gap 136 can be defined by one or more portions of the ligament 86. As illustrated, by way of example, a first ligament leg 140, a second ligament leg 142, and a portion of the second interior surface 24 of the second body 14. The ligament gap 136 can be fluidly coupled to or fluidly isolated from the gap region 30.

Figure 5:
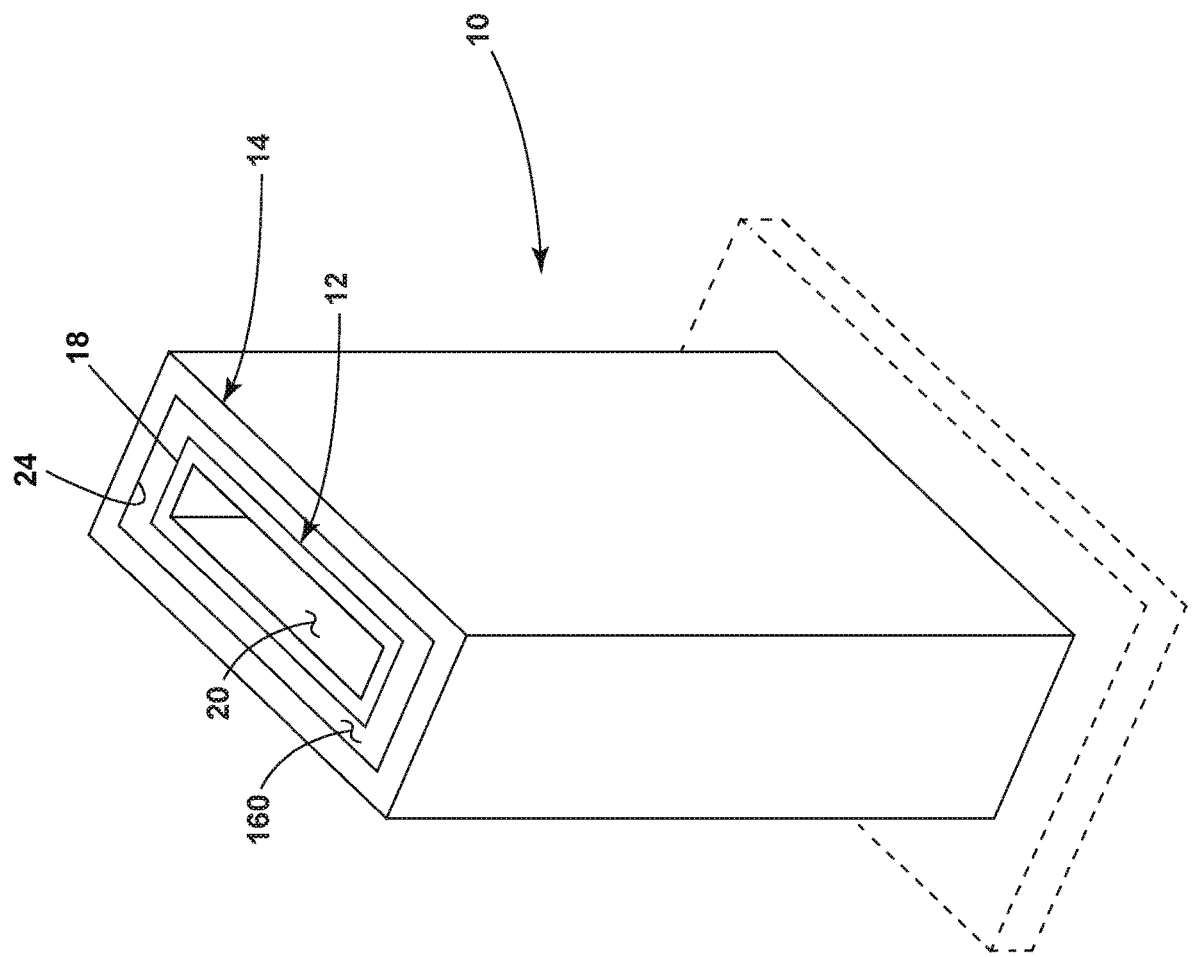
FIG. 5 is a schematic illustration of the casting assembly of FIG. 1 in accordance with an exemplary embodiment of the present disclosure.

FIG. 5 illustrates the casting assembly 10 during investment casting, wherein a metal 160 in the form of molten metal is provided between the first body 12 and the second body 14 of the casting assembly 10. More specifically, molten metal is poured or otherwise provided between the second interior surface 24 of the second body 14 and the first exterior surface 18 of the first body 12. That is, the gap region 30 (FIG. 1) receives the molten metal 160.

The molten metal 160 can be a superalloy such as, but not limited to any one or more of stainless steel, aluminum, titanium, cobalt chrome, nickel, among other metal materials or any alloy; such as nickel (Ni) superalloys, and/or Ni superalloy single crystal alloys. The molten metal 160 can then be cooled and demolded from the casting assembly 10 to define a cast component 162 (see FIG. 6).

It is contemplated that the casting hollow 20 can receive material such as fluid, wax, or metal. Optional materials added to the casting hollow 20 do not form the cast component 162 (see FIG. 7). Alternatively, materials added to the casting hollow 20 are removable from the cast component 162.

Figure 6:
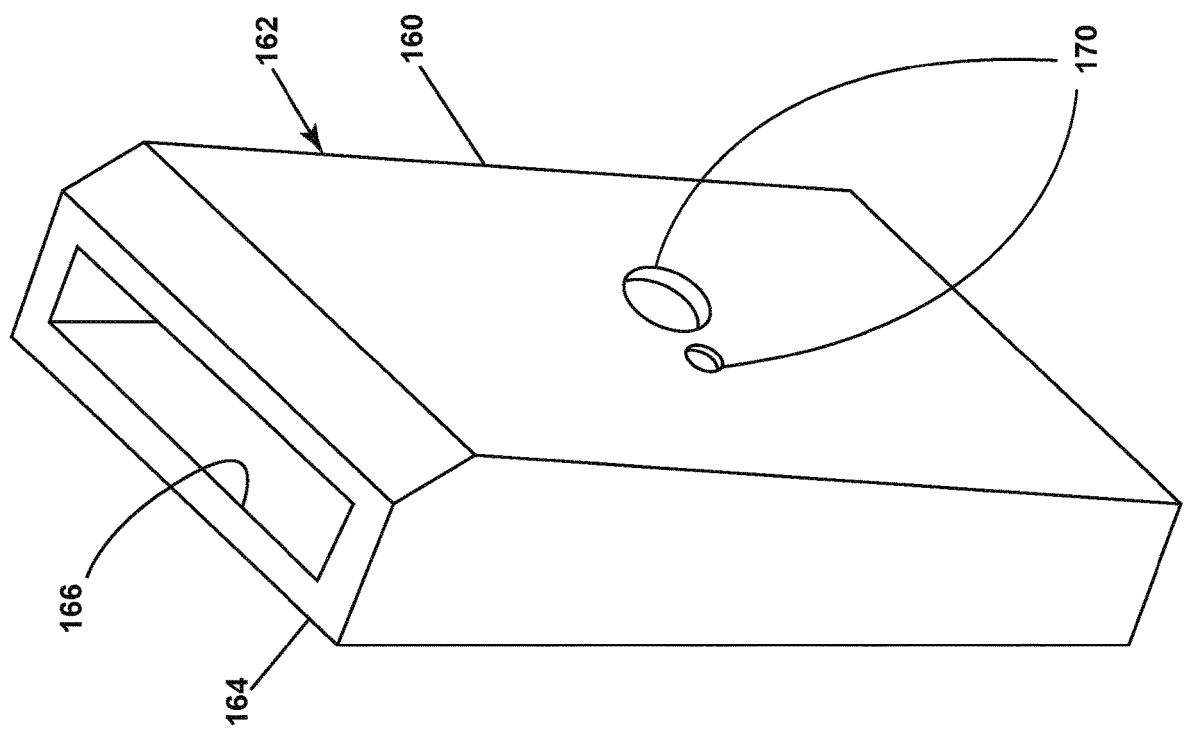
FIG. 6 is a schematic illustration of the cast component of FIG. 5 in accordance with an exemplary embodiment of the present disclosure.

FIG. 6 illustrates an example of the cast component 162 formed from the solidification of the molten metal 160. The cast component 162 can have an exterior part surface 164 and an interior part surface 166. The exterior part surface 164 can be a complementary shape to the second interior surface 24 of the second body 14. The interior part surface 166 of the cast component 162 can be a complementary shape to the first exterior surface 18 of the first body 12.

By way of example, apertures 170 in the cast component 162 can be a complementary shape to the first ligament leg 140 and the second ligament leg 142 (see FIG. 4). While illustrated as apertures 170, any number of pass-throughs, recesses, or protrusions of the cast component 162 due to any number of ligaments or surface geometries are contemplated.

Figure 7:
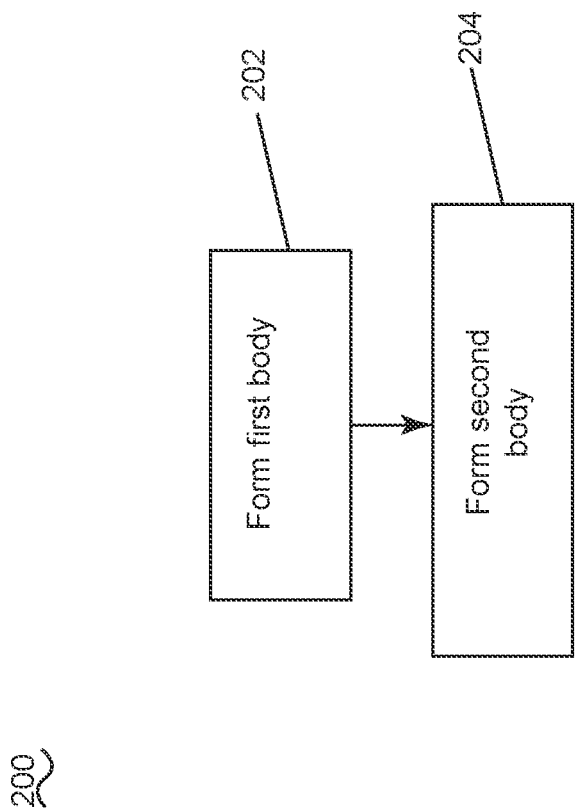
FIG. 7 is a flow chart illustrating a method of forming the investment casting mold of FIG. 3 in accordance with an exemplary embodiment of the present disclosure.

FIG. 7 is a method 200 of forming the casting assembly 10. The casting assembly 10 can be formed from the first ceramic material, for example, via additive manufacturing.

With additional reference to FIGS. 1-6, at 202, the first body 12 is formed. The first body 12 includes the casting hollow 20, although any number of first bodies or casting hollows are contemplated. The casting hollow 20 includes at least one structural element 22. The structural element 22 can be the support structures 22b, 22c or stiffening structures 22a, 22d depending on if the structural element 22 spans the casting hollow 20 or protrudes into the casting hollow 20, respectively.

Optionally, the casting hollow 20 can be filled with material. The material can be added to the casting hollow 20 at the upper opening 66 or the lower opening 70. However, the opening distance 85 of the upper opening 66 is less than the maximum gap distance 87.

At 204, the second body 14 is formed. It is contemplated that the first body 12 and the second body 14 are additive manufactured simultaneously. It is further contemplated that the first body 12 and the second body 14 are integrally formed. Optionally, the first body 12 and the second body 14 can be a single monolithic ceramic.

Optionally, the casting hollow 20 can be filled or coated with one or more materials. By way of non-limiting example, the one or more materials can be wet or dry (liquid or solid) material or combination therein. The one or more materials can be leachable or removable material.

The one or more materials can be a slurry, particulate, or powder. By way of further non-limiting example, the one or more materials can include a liquid or solid ceramic such silica, alumina, zirconia, zircon, yttria, or silicon carbide. The material can be similar to the first body 12 or dissimilar for insulating or conducting reasons to affect the cast structure.

The one or more materials can be added to the casting hollow 20 at the upper opening 66 or the lower opening 70. However, the opening distance 85 of the upper opening 66 or the lower opening 70 is less than the maximum gap distance 87, therefore if optional material is added to the casting hollow 20, it cannot be removed in a single piece. In other words, a die cannot be removed from the casting hollow 20.

Optionally, the casting assembly 10 can be coated. It is contemplated that the coating can cover at least a portion of at least the second exterior surface 26; however, coating on any surface the casting assembly 10 is contemplated.

Figure 8:
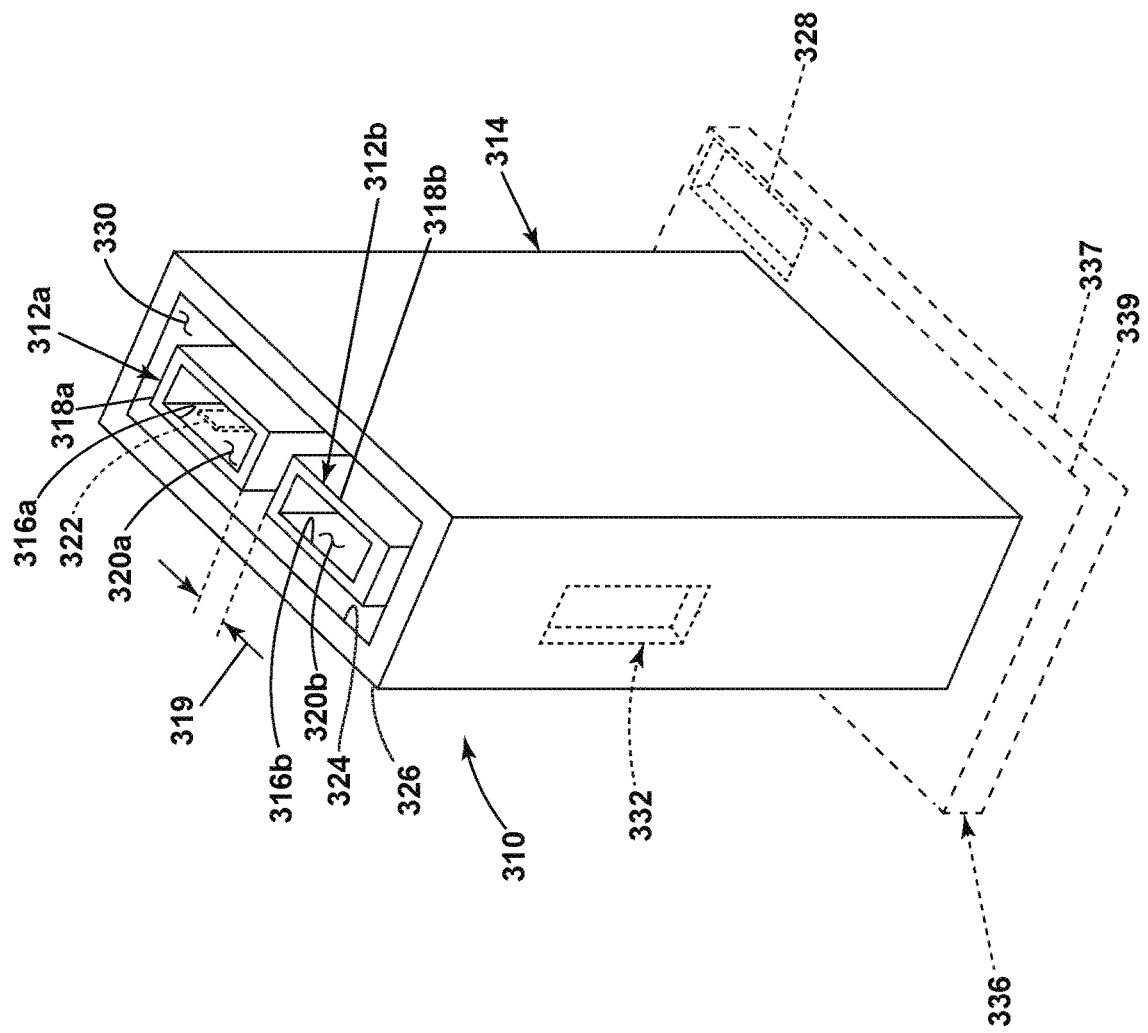
FIG. 8 is a schematic illustration of a casting assembly in accordance with an exemplary embodiment of the present disclosure.

Turning to FIG. 8, a schematic illustration of a casting assembly 310 according to an aspect of the disclosure herein is illustrated. The casting assembly 310 is similar to the casting assembly 10, therefore, like parts of the casting assembly 310 will be identified with like numerals increased by 300, with it being understood that the description of the like parts of the casting assembly 10 applies to the casting assembly 310, except where noted.

The casting assembly 300 can include a plurality of first bodies 312a, 312b and a second body 314. While illustrated as having two first bodies 312a, 312b, any number of first bodies are contemplated.

The second body 314 at least partially surrounds the first bodies 312a, 312b. That is, the second body 314 can circumscribe, partially circumscribe, or form an arc around at least a portion of the first bodies 312a, 312b.

The first bodies 312a, 312b and the second body 314 can be integrally formed. Further, the first bodies 312a, 312b and the second body 314 can be unitarily formed. It is contemplated that the first bodies 312a, 312b and the second body 314 can be unitarily formed through additively manufactured such that the one or more linking portions are formed between the first bodies 312a, 312b or between the first bodies 312a, 312b and the second body 314 during the additive manufacturing process. Any number of linking portions are contemplated.

The first bodies 312a, 312b includes first interior surfaces 316a, 316b and first exterior surfaces 318a, 318b, where the first exterior surfaces 318a, 318b are spaced from the respective first interior surfaces 316a, 316b. The first exterior surfaces 318a, 318b can be complementary to a shape to one or more portions of a surface of a cast part or cast component. The cast component can be a component for a turbine engine such as, but not limited to, an airfoil, blade, vane, shroud, fuel nozzle, combustion liner, shroud hanger, combustor dome, deflector, or fairings.

A first body distance 319 can be measured between each of the first exterior surfaces 318a, 318b. That is the first bodies 312a, 312b can be distinct, spaced, separated, or otherwise define a gap between at least portions of each of the first bodies 312a, 312b.

A plurality of casting hollows 320a, 320b are hollow spaces at least partially bound by the respective first interior surfaces 316a, 316b. As illustrated, by way of example, the first interior surfaces 316a, 316b form a perimeter, periphery, boundary, or otherwise outlines the respective casting hollows 320a, 320b.

The casting hollows 320a, 320b, are illustrated as a void or space having the shape of a rectangular prism, can be any shape or combination of shapes. While illustrated as having similar shape and dimension, the first bodies 312a, 312b can have differing shapes and sizes.

A structural element 322 can be located within at least one of the casting hollows 320a, 320b. While the structural element 322 is illustrated as a single element, any number of structural elements are contemplated.

The second body 314 includes a second interior surface 324 and a second exterior surface 326, where the second exterior surface 326 is spaced from the second interior surface 324.

A gap region 330 is defined by or bound by at least a portion of the first exterior surfaces 318a, 318b of the first bodies 312a, 312b and at least a portion of the second interior surface 324 of the second body 314.

By way of non-limiting example, the first bodies 312a, 312b and the second body 314 are illustrated as hollow rectangular prisms to ease description and explanation. While illustrated as a hollow rectangular prism, any shape or combination of shapes is contemplated for each of the first bodies 312a, 312b, the second body 314, the casting hollows 320a, 3230b, or the gap region 330. For example, at least one of the first bodies 312a, 312b or the second body 314 can be a hollow prism having a cross-section that is a circle, oval, ellipse, square, any regular or irregular polygon, or any combination therein. That is, the first bodies 312a, 312b or the second body 314 can include a complex or compound shape.

Optionally, at least one aperture or a window 332 can be included in the second body 314.

A mold base 336 can support at least a portion of at least one of the first bodies 312a, 312b, or the second body 314. It is contemplated that the mold base 336 can be additively manufactured with or otherwise coupled to at least a portion of the first bodies 312a, 312b and the second body 314, forming one or more linking portions between the first bodies 312a, 312b and the second body 314. Further, the mold base 336 can include a base window 328 that extends through the mold base 336 from a first base surface 337 to a second base surface 339.

Benefits associated with the casting assembly as described herein include improved accuracy of the dimensions of the cast component.

The casting hollow can reduce extra forces on the first body during additive manufacturing of the casting assembly. The reduction of extra forces on the casting assembly during printing improves the accuracy of the dimensions of the casting assembly. Improvement in the dimensions of the casting assembly can also result improved accuracy of the dimensions of the cast component.

Thickness differences in a casting assembly can create geometric shrinkage defects during firing. The casting hollow of the casting assembly as disclosed herein allows for the thickness of the first body or core to fall within a predetermined range. That is, the casting hollow allows for tailoring of the thickness of the first body or core, where the thickness is tailored to control or minimize shrinkage during firing. Thus, the casting hollow can decrease thickness differences and reduce geometric shrinkage due to thickness differences. Reducing geometric shrinkage during firing improves the accuracy of the casting assembly and therefore improves the accuracy of the dimensions of the cast component.

Additional benefits of the casting hollow include reducing grain defects in the cast component that can occur during casting.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Benefits of the structural elements included in the casting hollow include tailored thickening or strengthening of the core or the first body. The support structures can span, extend across, or otherwise connect two portions of the first interior surface. The support structures provide a connecting geometry that stiffens or strengths wall across the casting hollow. The stiffening structures provide a raised geometry on at least one portion of the first interior surface that defines the casting hollow. The stiffening structures can stiffen the wall or provide thickness needed to reduce or redistribute extra forces, reduce geometric shrinkage, or reduce grain defects.

Further aspects of the disclosure are provided by the subject matter of the following clauses:

A casting assembly for forming a cast component comprising a first body having a first interior surface and a first exterior surface, spaced from the first interior surface, with the first exterior surface defining a part surface of the cast component, and the first interior surface at least partially bounding a casting hollow, and a second body with a second exterior surface spaced from a second interior surface, with at least a portion of the second interior surface spaced from and facing the first exterior surface.

A casting assembly for forming a cast component comprising a first body having a first interior surface and a first exterior surface, spaced from the first interior surface, with the first exterior surface defining a part surface of the cast component, and the first interior surface at least partially bounding a casting hollow, a structural element located within the casting hollow, and a second body with a second exterior surface spaced from a second interior surface, with at least a portion of the second interior surface spaced from and facing the first exterior surface.

The casting assembly of any preceding clause, wherein the first body and the second body are unitarily formed.

The casting assembly of any preceding clause, wherein at least a portion of the first body and the second body are a single monolithic ceramic.

The casting assembly of any preceding clause, further comprising a ligament extending between the first body and the second body.

The casting assembly of any preceding clause, wherein a cross-sectional area of the ligament increases or decreases as the ligament extends from the first exterior surface to the second interior surface.

The casting assembly of any preceding clause, wherein the ligament is a plurality of ligaments extending from the first exterior surface to the second interior surface.

The casting assembly of any preceding clause, wherein the first body is a plurality of first bodies, wherein at least one of the plurality of first bodies defines the casting hollow.

The casting assembly of any preceding clause, wherein the casting hollow defines a centerline, wherein the centerline is a non-linear centerline.

The casting assembly of any preceding clause, wherein the first interior surface includes a curved portion defined by a radius of curvature.

The casting assembly of any preceding clause, wherein the casting hollow includes an opening at a first upper portion or a first lower portion of the first body.

The casting assembly of any preceding clause, wherein the opening includes an opening distance between 1% or 300% of a maximum gap distance of the casting hollow.

The casting assembly of any preceding clause, wherein the opening includes an opening distance and the casting hollow includes a maximum gap distance, wherein a ratio of the maximum gap distance of the casting hollow to the opening distance is greater than one.

The casting assembly of any preceding clause, further comprising a structural element located within the casting hollow.

The casting assembly of any preceding clause, wherein the structural element is a protuberance from the first interior surface.

The casting assembly of any preceding clause, wherein the structural element is a support structure that spans the casting hollow.

The casting assembly of any preceding clause, further comprising a ligament extending between the first body and the second body.

The casting assembly of any preceding clause, wherein the structural element is a set of support structures and a set of stiffening structures.

The casting assembly of any preceding clause, wherein the structural element is a stiffening structure projecting from the first interior surface into the casting hollow a distance as measured from the first interior surface to an outermost extent or interior surface of the stiffening structure.

The casting assembly of any preceding clause, wherein a shape of the first exterior surface of the first body is complementary to at least a portion of an airfoil, blade, vane, shroud, fuel nozzle, combustion liner, shroud hanger, combustor dome, deflector, or fairings.

The casting assembly of any preceding clause, further comprising a mold base coupled to at least a portion of at least one of the first body or the second body.

The casting assembly of any preceding clause, wherein the mold base includes at least one base window.

The casting assembly of any preceding clause, wherein at least a portion of at least one stiffening structure of the set of stiffening structures or at least a portion of at least one support structure of the set of support structures has a cross-section having a shape that is one of at least one of a: circle, rounded rectangle, oval, regular polygon, irregular polygon, V-shaped, U-shaped, X-shaped, T-shape, crescent, semi-circle, teardrop, or trefoil.

The casting assembly of any preceding clause, wherein the support structure has a support height measured from a first face to a second face, opposing the first face.

The casting assembly of any preceding clause, wherein the support height is 20%-20,000% of a first body thickness or a second body thickness measured along a plane defined by a Y-axis.

The casting assembly of any preceding clause, wherein the support height varies from a first intersection, defined by an intersection of the support structure and the first face, and a second intersection, defined by an intersection of the support structure and the second face.

The casting assembly of any preceding clause, wherein the distance is between 15%-400% of a thickness of the first body thickness or a second body thickness 46.

The casting assembly of any preceding clause, wherein the first exterior surface and the second interior surface bound a gap region.

The casting assembly of any preceding clause, wherein the gap region is configured to receive molten material.

The casting assembly of any preceding clause, wherein the first body is a core of an intermediate investment casting mold.

The casting assembly of any preceding clause, wherein the second body is a shell of the intermediate investment casting mold.

The casting assembly of any preceding clause, wherein the core and the shell are additively manufactured.

The casting assembly of any preceding clause, wherein the structural element is a set of structural elements, wherein at least two structural elements of the set of structural elements intersect or overlap at an interface.

The casting assembly of any preceding clause, wherein the first body can be a set of first bodies, wherein the second body is spaced from and at least partially circumscribes the set of first bodies.

The casting assembly of any preceding clause, wherein the set of first bodies defining a set of casting hollows and a set of first interior walls, wherein a set of stiffening structures or a set of support structures extending from the set of first interior walls into the set of casting hollows.

The casting assembly of any preceding clause, wherein the plurality of first bodies define a plurality of casting hollows.

We claim:

1. A casting assembly for forming a cast component, comprising:
   a first body having a first interior surface and a first exterior surface, spaced from the first interior surface, with the first exterior surface defining a part surface of the cast component, and the first interior surface at least partially bounding a casting hollow;
   a second body with a second exterior surface spaced from a second interior surface, with at least a portion of the second interior surface spaced from and facing the first exterior surface; and
   a mold base coupled to at least a portion of at least one of the first body or the second body.

2. The casting assembly of claim 1, wherein the first body and the second body are unitarily formed.

3. The casting assembly of claim 2, wherein at least a portion of the first body and the second body are a single monolithic ceramic.

4. The casting assembly of claim 1, further comprising a ligament extending between the first body and the second body.

5. The casting assembly of claim 4, wherein a cross-sectional area of the ligament increases or decreases as the ligament extends from the first exterior surface to the second interior surface.

6. The casting assembly of claim 4, wherein the ligament is a plurality of ligaments extending from the first exterior surface to the second interior surface.

7. The casting assembly of claim 1, wherein the first interior surface includes a curved portion defined by a radius of curvature.

8. The casting assembly of claim 1, further comprising a structural element, wherein the structural element is at least one of a set of support structures and a set of stiffening structures, or a stiffening structure projecting from the first interior surface into the casting hollow a distance as measured from the first interior surface to an outermost extent or interior surface of the stiffening structure.

9. The casting assembly of claim 8, wherein the structural element is a set of structural elements, wherein at least two structural elements of the set of structural elements intersect or overlap at an interface.

10. The casting assembly of claim 1, wherein a shape of the first exterior surface of the first body is complementary to at least a portion of an airfoil, blade, vane, shroud, fuel nozzle, combustion liner, shroud hanger, combustor dome, deflector, or fairings.

11. The casting assembly of claim 1, wherein the mold base includes at least one base window.

12. The casting assembly of claim 1, wherein the first body is a plurality of first bodies, wherein at least one of the plurality of first bodies defines the casting hollow.

13. The casting assembly of claim 1, wherein the casting hollow includes an opening at a first upper portion or a first lower portion of the first body.

14. The casting assembly of claim 13, wherein the opening includes an opening distance and the casting hollow includes a maximum gap distance, wherein a ratio of the maximum gap distance of the casting hollow to the opening distance is greater than one.

15. The casting assembly of claim 1, further comprising a structural element located within the casting hollow, wherein the structural element is at least one of a protuberance from the first interior surface, a support structure that spans the casting hollow, a set of support structures, or a set of stiffening structures.

16. The casting assembly of claim 1, wherein the casting hollow defines a centerline and wherein the centerline is a non-linear centerline.

17. The casting assembly of claim 1, further comprising a support structure having a support height measured from a first face to a second face, opposing the first face.

18. The casting assembly of claim 17, wherein the support height varies from a first intersection, defined by an intersection of the support structure and the first face, and a second intersection, defined by an intersection of the support structure and the second face.

19. A casting assembly for forming a cast component, comprising:
a first body having a first interior surface and a first exterior surface, spaced from the first interior surface, with the first exterior surface defining a part surface of the cast component, and the first interior surface at least partially bounding a casting hollow, wherein the casting hollow includes an opening at a first upper portion or a first lower portion of the first body, wherein the opening includes an opening distance and the casting hollow includes a maximum gap distance, wherein a ratio of the maximum gap distance of the casting hollow to the opening distance is greater than one; and
a second body with a second exterior surface spaced from a second interior surface, with at least a portion of the second interior surface spaced from and facing the first exterior surface.

20. The casting assembly of claim 19, further comprising a ligament extending between the first body and the second body.

21. The casting assembly of claim 20, wherein a cross-sectional area of the ligament increases or decreases as the ligament extends from the first exterior surface to the second interior surface.

22. The casting assembly of claim 20, wherein the ligament is a plurality of ligaments extending from the first exterior surface to the second interior surface.

23. The casting assembly of claim 19, wherein the first body is a plurality of first bodies, wherein at least one of the plurality of first bodies defines the casting hollow.

24. The casting assembly of claim 19, further comprising a structural element located within the casting hollow, wherein the structural element is at least one of a protuberance from the first interior surface, a support structure that spans the casting hollow, a set of support structures, or a set of stiffening structures.

25. The casting assembly of claim 24, wherein the structural element is a set of structural elements, wherein at least two structural elements of the set of structural elements intersect or overlap at an interface.

26. The casting assembly of claim 19, wherein a shape of the first exterior surface of the first body is complementary to at least a portion of an airfoil, blade, vane, shroud, fuel nozzle, combustion liner, shroud hanger, combustor dome, deflector, or fairings.

27. The casting assembly of claim 19, wherein the first body and the second body are unitarily formed.

28. The casting assembly of claim 27, wherein at least a portion of the first body and the second body are a single monolithic ceramic.

29. The casting assembly of claim 19, further comprising a support structure having a support height measured from a first face to a second face, opposing the first face.

30. The casting assembly of claim 29, wherein the support height varies from a first intersection, defined by an intersection of the support structure and the first face, and a second intersection, defined by an intersection of the support structure and the second face.

* * * * *